United States Patent [19]

Chimel

[11] Patent Number: 5,653,414
[45] Date of Patent: Aug. 5, 1997

[54] CLIP FOR HOLDING EYEGLASSES

[76] Inventor: Richard A. Chimel, 1631 S. Galena St. #416, Denver, Colo. 80231

[21] Appl. No.: 560,899

[22] Filed: Nov. 20, 1995

[51] Int. Cl.$^6$ .................................................. A47G 1/10
[52] U.S. Cl. .............................. 248/316.7; 248/902
[58] Field of Search ............................ 248/316.7, 902

[56] References Cited

U.S. PATENT DOCUMENTS

| | | | |
|---|---|---|---|
| 319,293 | 6/1885 | Merritt | 248/902 X |
| 1,931,286 | 10/1933 | Drew | 248/902 X |
| 2,658,247 | 11/1953 | Heuer | 248/316.7 X |
| 2,828,387 | 3/1958 | Rutten | 248/902 X |
| 3,015,869 | 1/1962 | Rapata | 248/71 X |
| 3,317,167 | 5/1967 | Becker et al. | 248/316.7 X |
| 4,279,396 | 7/1981 | Bendock | 248/316.7 X |
| 4,946,125 | 8/1990 | McCarty | 248/316.7 |
| 5,082,225 | 1/1992 | Nespoli | 248/316.7 X |
| 5,137,242 | 8/1992 | Reath | 248/902 X |

FOREIGN PATENT DOCUMENTS 448022  8/1934  United Kingdom .............. 248/902

*Primary Examiner*—Leslie A. Braun
*Assistant Examiner*—Anita M. King
*Attorney, Agent, or Firm*—Edwin H. Crabtree; Raman L. Pizarro; Donald W. Margolis

[57] ABSTRACT

A clip for holding eyeglasses and the like in place on a surface in a vehicle. The eyeglasses having an eyeglass frame with a pair of nose pieces and a pair of temple members thereon. The clip is designed for easy entry and exit by the eyeglasses and to prevent both longitudinal and lateral movement of the eyeglasses when held thereon. The eyeglass clip includes an upper support arm with a back end portion, a middle portion and a front end portion and a lower support arm with a back end portion and a front end portion. A loop portion integrally joins the back end portion of the upper support arm to the back end portion of the lower support arm. The upper support arm is characterized by the middle portion curving downwardly toward the lower support arm and the front end portion curving upwardly as in a "ski jump". The curving of the upper support member provides for ease in inserting the temple members of the frame between the upper and lower support arms. The second end of the upper support arm is dimensioned in width for receipt between the opposite nose pieces on the frame to prevent lateral movement of the eyeglasses. An attachment member is secured to the exterior surface of the lower support arm for attaching the eyeglass clip to the flat surface. The clip may be made of soft or hard plastic and like materials and may be mounted horizontally, vertically and at various angles on the surface.

13 Claims, 1 Drawing Sheet

CLIP FOR HOLDING EYEGLASSES

BACKGROUND OF THE INVENTION (a) Field of the Invention

This invention relates to an eyeglass holder and more particularly, but not by way of limitation, to a single piece clip for holding eyeglasses, sunglasses and other eyewear on a surface in a vehicle and other applications.

(b) Discussion of Prior Art

Heretofore there have been a variety of different types of article holders in the form of hooks and clips as described in U.S. Pat. No. 3,350,045 to Mayers, U.S. Pat. No. 3,409,257 to Elm and U.S. Pat. No. 3,309,052. These patents do not specifically disclose the article holders used for receiving and holding eyewear in place.

U.S. Pat. No. 4,695,026 to Medley, Jr. describes a holder for eyeglasses having a support member for receiving an eyeglass nose piece and a clamping member for holding the eyeglasses in place. A base member includes a double sided tape for securing the holder to a car dashboard and other surfaces. U.S. Pat. No. 4,452,354 to Tabachnick disclose another type of eyeglass holder in the form of a tube of flexible plastic. The tube is used to receive one of the ear pieces therethrough and suspend the eyeglass. The back side of the tube includes an adhesive strip for mounting to a surface such as a dashboard.

U.S. Pat. No. 2,826,387 to Rutten and PCT application US92/00104 to Reath describe two types of eyeglass holders for holding the frame and ear pieces of the eyeglass in place in different positions on various types of flat surfaces.

None of the above mentioned patents specifically disclose or teach the unique structure and function of the subject single piece clip for holding eyeglasses as described herein.

SUMMARY OF THE INVENTION

In view of the foregoing, it is an object of the present invention to provide a single piece clip for holding eyeglasses, sunglasses and other eyewear in place on a surface in a vehicle or other applications.

Another object of the invention is to provide an eyeglass clip that can quickly be installed and easily used for receiving and holding different types and sizes of eyewear.

Still another object of the clip is when the eyeglasses are received therein, the glasses are held in place with little or no longitudinal or lateral movement. The clip is designed for easy receipt of the eyewear and removal therefrom.

The subject invention includes an upper support arm with a back end portion, a middle portion and a front end portion and a lower support arm with a back end portion and a front end portion. A loop portion integrally joins the back end portion of the upper support arm to the back end portion of the lower support arm. The upper support arm is characterized by the middle portion curving downwardly toward the lower support arm and the front end portion curving upwardly as in a "ski jump". The curving of the upper support member provides for ease in inserting the temple members of the frame between the upper and lower support arms. Interior surfaces of the upper and lower support arms may be lined with a soft foam material for helping hold the eyeglasses in place and for preventing the scratching of the eyeglasses. The front end of the upper support arm is dimensioned in width for receipt between the opposite nose pieces of the frame and provides a snug fit to prevent lateral movement of the eyeglasses. An attachment member is secured to the exterior surface of the lower support arm for attaching the eyeglass clip to the flat surface. The clip may be made of soft or hard plastic and like materials and may be mounted horizontally, vertically and at various angles on the surface.

These and other objects of the present invention will become apparent to those familiar with eyewear and devices used for holding eyeglasses in vehicles and other applications when reviewing the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
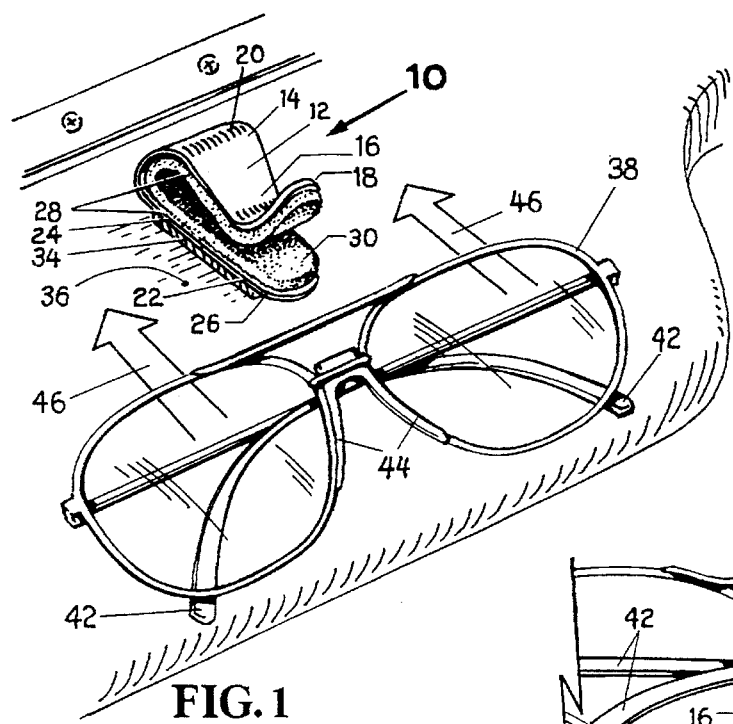
FIG. 1 is a perspective view of one embodiment of the subject eyeglass clip With a pair of glasses positioned for receipt in the clip.

In FIG. 1, the subject one piece eyeglass clip is designated by general reference numeral 10. The clip 10 includes an upper support arm 12 having a back end portion 14, a middle portion 16 and a front end portion 18. The clip 10 also includes a loop portion 20 and a lower support arm 22 having a back end portion 24 and a front end portion 26. The loop portion 20 integrally joins together the back end portion 14 of the upper support arm 12 with the back end portion 24 of the lower support arm. The upper support arm 12 is characterized by the middle portion curving downwardly toward the lower support arm 22 and the front end portion 18 curving upwardly as in a "ski jump".

An interior surface 28 of the upper support arm 12, loop portion 20 and lower support arm 22 is lined with a soft foam material 30 to prevent the scratching of eyeglasses and for helping hold the eyeglasses in place. An exterior surface 32 of the lower support arm 22 is secured to an attachment member 34. The attachment member 34 may be double sided tape, an adhesive or any other similar material for holding the clip 10 on a surface 36 of a vehicle dashboard and other surfaces convenient for mounting the clip 10 thereon.

Also shown in FIG. 1 is a pair of eyeglasses having general reference numeral 38. The eyeglasses 38 include a frame 40 with a pair of temple members 42 and a pair of nose pieces 44. The temple members 42 are obviously used for holding the eyeglasses 38 on the side of the head of a user and the nose pieces 44 used for receipt on the opposite sides of the nose of the user. The frame 40 is shown with the temple members 42 folded and the eyeglasses 38 positioned for receipt inside the clip 10 as indicated by arrows 46.

Figure 2:
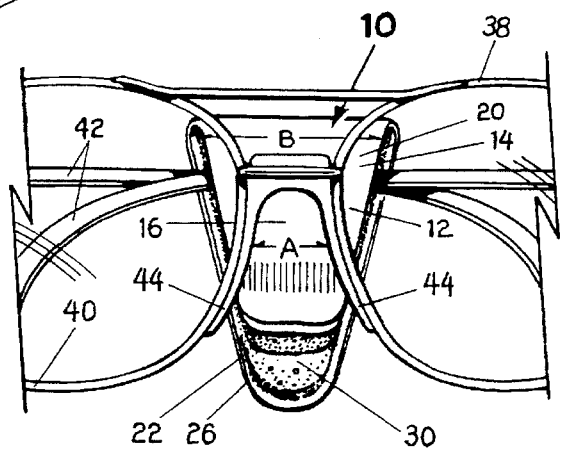
FIG. 2 is a top view of the single piece clip with the eyeglasses received therein and a portion of an upper support arm of the clip front received between the nose pieces of the eyeglass frame.

In FIG. 2 a top view of the clip 10 is shown with a portion of the eyeglasses 38 received therein. Note part of the middle portion 16 of the upper support arm 12 is designed for receipt between the nose pieces 44 of the frame 40 and prevent lateral movement of the eyeglasses when held thereon. The width of the middle portion 16 has a dimension of "A" and is in a range of ½ to 1 inch. Also note that the back end portion 14 of the upper support arm 12 flares outwardly into the loop portion 20. The width of the loop portion 20 in this example has a dimension of "B" and is in a range of ½ to 2 inches.

Figure 3:
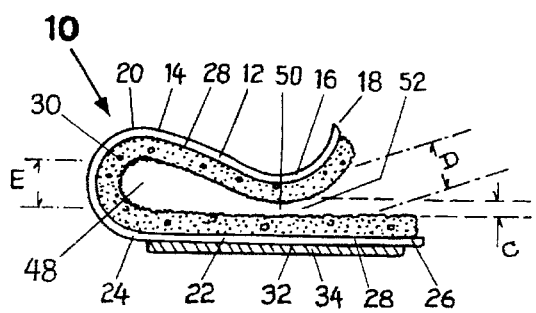
FIG. 3 is a side view of the single piece clip with various dimensions making up the clip.

In FIG. 3 a side view of the single piece clip 10 is shown and the curved design of the upper support arm 12 can be easily seen. The middle portion 16 curving downwardly toward the lower support arm 22 leaves a gap 50 as an entrance for the temple members 42 of the frame 40. The gap 50 having a height "C" in a range of 1/16 to ¼ inches. The height "C" of the gap 50 can be expanded by the flexibility of raising the upper support arm 12. The narrow gap 50 prevents the eyeglasses 38 from coming loose from clip 10. Also the front end portion 18 of the upper support arm 12 being curved upwardly as shown provides an opening 52 having a clearance "D" in a range of ½ and 1 inches between the end of the front end portion 18 and the front end portion 26 of the lower support arm 26. This opening 52 with increased clearance "D" provides a large target area for receiving the eyeglasses 38 and allows for ease in slipping the temple members 42 into and between the upper and lower support arms 12 and 22. Note the end of the front end portion 26 of the lower support arm 22 extends outwardly from the end of the front end portion 18 of the upper support arm 12 for ease in receiving the temple members 42 thereon and while inserting the temple members into the clip 10. The loop portion 20 in this drawing is shown having an interior cavity 48 with a height dimension "E" in a range of ⅛ to ½ inches. The interior cavity 48 is sufficient in height for holding a portion of different sizes and shapes of temple members 42 as shown in FIG. 4.

Figure 4:
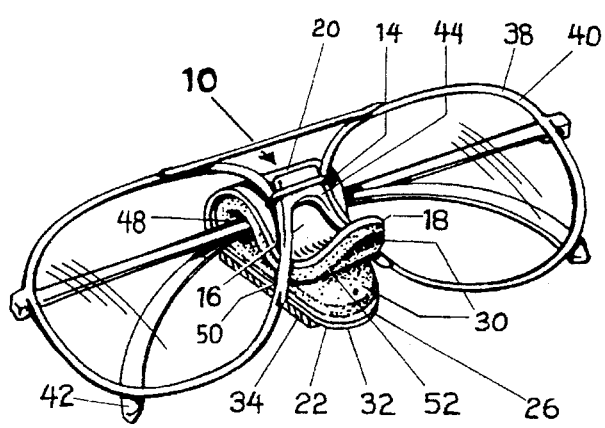
FIG. 4 is a similar perspective view as shown in FIG. 1 with the eyeglasses received and held in the clip.

FIG. 4 is a perspective view of the clip 10 and eyeglass 38 with the eyeglass 38 received in the clip 10 and the folded temple members 42 resting inside the interior cavity 48. The middle portion 16 of the upper support arm 12 is shown received between the nose pieces 44 of the frame 40. When the eyeglasses 38 are removed from the clip 10, the temple members 42 are moved forward through the gap 50 between the middle portion 16 of the upper support member 12 and the lower support member 22 until the exit is complete.

Figure 5:
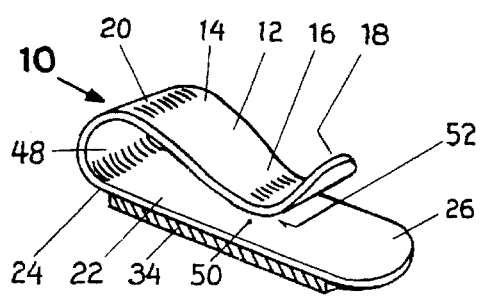
FIG. 5 is a perspective view of another embodiment of the subject eyeglass clip.

In FIG. 5 another embodiment of the clip 10 is illustrated wherein the soft foam material is removed and the support arms 12 and 22 and the loop portion 20 are made of a soft non-scratch material. The clip 10 in FIG. 5 has the same configuration as the clip shown in FIGS. 1–4 except the width of the loop portion 20 in FIG. 5 is the same as the width of the upper support arm 12 and lower support arm 22. Also the clip 10 shown in FIGS. 1–4 may be made of soft non-scratch material and eliminate the need of using the soft foam material 30 as a liner. While the clip 10 is shown having two different geometric configuration in FIGS. 1–4 and FIG. 5, it should be kept in mind other configurations may be adapted equally well without departing from the spirit and scope of the invention as described.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A substantially "U" SHAPED clip for securely holding eyeglasses and the like in place on a surface, the eyeglasses having an eyeglass frame with a pair of nose pieces and a pair of temple members thereon, the clip comprising:

an upper support arm with a back end portion, a middle portion and a front end portion, opposite sides of said upper support arm tapered inwardly from the back end portion to the front end portion;

a lower support arm with a back end portion and a front end portion, said lower support arm disposed below said upper support arm, said upper support arm characterized by the middle portion curving downwardly toward said lower support arm and the front end portion of said upper support arm curving upwardly as in a "ski jump";

a loop portion integrally joining the back end portion of said upper support arm to the back end portion of said lower support arm, the temple members of the eyeglass frame adapted for receipt in an uninterrupted opening between said upper support arm and said lower support arm with a portion of said upper support arm adapted or receipt between the nose pieces of the eyeglass frame; and whereby the temple members of the eyeglass frame are adapted to be received between said upper support arm and said lower support arm, the tapering of the opposite sides of said upper support arm providing a guide for receiving said upper support arm between the nose pieces, the tapering of the opposite sides of said upper support arm also allowing for a snug fit with individual eyeglasses having different width between their nose pieces and said upper support arm having an upper surface adapted to support the eyeglasses nose pieces between the middle portion and the front end portion of said upper support arm.

2. The clip as described in claim 1 further including an attachment member secured to an exterior surface of said lower support arm for securing the clip to the surface.

3. The clip as described in claim 1 wherein an interior surface of said upper and lower support arms and said loop portion is lined with a soft foam material for helping hold the frame in the clip when stored therein and for preventing scratching of the eyeglass frame.

4. The clip as described in claim 1 wherein the clip is made of a soft plastic material for preventing scratching of the eyeglass frame and mounted horizontally, vertically and at various angles on the surface.

5. The clip as described in claim 1 wherein the clip is made of a hard plastic materials and mounted horizontally, vertically and at various angles on the surface.

6. A substantially "U" shaped clip for securely holding eyeglasses and the like in place on a surface, the eyeglasses having an eyeglass frame with a pair of nose pieces and a pair of temple members thereon, the clip comprising:

an upper support arm with a back end portion, a middle portion and a front end portion, opposite sides of said upper support arm tapered inwardly from the back end portion to the front end portion;

a lower support arm with a back end portion and a front end portion, said lower support arm disposed below said upper support arm, said upper support arm characterized by the middle portion curving downwardly toward said lower support arm and the front end portion of said upper support arm curving upwardly as in a "ski jump";

a loop portion integrally joining the back end portion of said upper support arm to the back end portion of said lower support arm, the temple members of the eyeglass frame adapted for receipt in an uninterrupted opening between said upper support arm and said lower support arm with a portion of said upper support arm adapted for receipt between the nose pieces of the eyeglass frame, the uninterrupted opening also having an enlarged opening portion between an end of the front end portion of said upper support arm and the front end portion of said lower support arm, the enlarged opening portion providing a target area for ease in receiving the temple members; and whereby the temple members of the eyeglass frame are adapted to be received between said upper support arm and said lower support arm, the tapering of the opposite sides of said upper support arm providing a guide for receiving said upper support arm between the nose pieces, the tapering of the opposite sides of said upper support arm also allowing for a snug fit with individual eyeglasses having different widths between their nose pieces and said upper support arm having an upper surface adapted to support the eyeglasses nose pieces between the middle portion and the front end portion of said upper support arm, the upper surface of said upper support arm preventing lateral movement of the eyeglasses thereon.

7. The clip as described in claim 6 wherein said loop portion includes an interior cavity therein having a height in a range of ⅛ to ½ inches, the height sufficient is size for holding a portion of different sizes and shapes of eyeglass temple members.

8. The clip as described in claim 6 wherein the front end of said upper support arm is dimensioned in width in a range of ½ to 1 inches for receipt between the opposite nose pieces on the eyeglass frame for providing a snug fit to prevent lateral movement of the eyeglasses.

9. A substantially "U" shaped clip for securely holding eyeglasses and the like in place on a surface, the eyeglasses having an eyeglass frame with a pair of nose pieces and a pair of temple members thereon, the clip comprising:

an upper support arm with a back end portion, a middle portion and a front end portion, opposite sides of said upper support arm tapered inwardly from the back end portion to the front end portion;

a lower support arm with a back end portion and a front end portion, said lower support arm disposed below said upper support arm, said upper support arm characterized by the middle portion curving downwardly toward said lower support arm and the front end portion of said upper support arm curving upwardly as in a "ski jump", the curved middle portion of said upper support arm forming a narrow gap adapted for receiving the temple members of the eyeglasses therebetween;

a loop portion integrally joining the back end portion of said upper support arm to the back end portion of said lower support arm, the temple members of the eyeglass frame adapted for receipt in an uninterrupted opening between said upper support arm and said lower support arm with a portion of said upper support arm adapted for receipt between the nose pieces of the eyeglass frame; and whereby the temple members of the eyeglass frame are adapted to be received between said upper support arm and said lower support arm, the tapering of the opposite sides of said upper support arm providing a guide for receiving said upper support arm between the nose pieces, the tapering of the opposite sides of said upper support arm also allowing for a snug fit with individual eyeglasses having different widths between their nose pieces and said upper support arm having an upper surface adapted to support the eyeglasses nose pieces between the middle portion and the front end portion of said upper support arm, the upper surface of said upper support arm preventing lateral movement of the eyeglasses thereon.

10. The clip as described in claim 9 wherein the gap between the middle portion of said upper support arm and said lower support arm is in a range of 1/16 to ¼ inches and greater when said upper support arm is raised above said lower support arm.

11. The clip as described in claim 9 wherein an opening between an end of the front end portion of said upper support arm and the front end portion of the said lower support arm is in a range of ½ to 1 inches, the opening provides a large target area for receiving the eyeglasses and allows for ease in slipping the temple members between said upper and lower support arms.

12. The clip as described in claim 9 wherein said loop portion includes an interior cavity therein having a height in a range of ⅛ to ½ inches, the height sufficient is size for holding a portion of different sizes and shapes of eyeglass temple members.

13. The clip as described in claim 9 wherein the front end of said upper support arm is dimensioned in width in a range of ½ to 1 inches for receipt between the opposite nose pieces on the eyeglass frame for providing a snug fit to prevent lateral movement of the eyeglasses.

\* \* \* \* \*